Jan. 8, 1963 M. W. DUNDORE ET AL 3,071,928

HYDRAULIC TORQUE CONVERTER

Filed Feb. 14, 1958 15 Sheets-Sheet 1

Inventors
Marvin W. Dundore
Raymond C. Schneider

By. [signature]
Attorney.

Inventors.
Marvin W. Dundore.
Raymond C. Schneider.
By. John O. Darley
Attorney.

Inventors.
Marvin W. Dundore.
Raymond C. Schneider.
By. John W. Darley
Attorney.

Inventors.
Marvin W. Dundore.
Raymond C. Schneider.
By. John W. Darley
Attorney.

Jan. 8, 1963 M. W. DUNDORE ET AL 3,071,928

HYDRAULIC TORQUE CONVERTER

Filed Feb. 14, 1958 15 Sheets-Sheet 5

Inventors.
Marvin W. Dundore.
Raymond C. Schneider.
By [signature]
Attorney.

Inventors.
Marvin W. Dundore
Raymond C. Schneider.
By. John W. Darley
Attorney.

Inventors.
Marvin W. Dundore.
Raymond C. Schneider.

By. [signature]
Attorney.

Inventors.
Marvin W. Dundore.
Raymond C. Schneider.
By. John W. Darley
Attorney.

INCHES

| | X | 000 | 0.40 | .692 | .800 | 1.20 | 1.60 | 2.00 | 2.40 | .280 | 3.20 | 3.60 | 3.862 |
|---|---|---|---|---|---|---|---|---|---|---|---|---|---|
| END RING | Y1 | .074 | .008 | — | .033 | .052 | .182 | .077 | .067 | .051 | .032 | .011 | .035 |
| | Y2 | .074 | .258 | — | .333 | .372 | .377 | .365 | .322 | .263 | .192 | .118 | .035 |
| CORE RING | Y1 | — | — | .194 | .121 | .090 | .082 | .077 | .067 | .051 | .032 | .011 | .035 |
| | Y2 | — | — | .194 | .274 | .343 | .377 | .365 | .322 | .263 | .192 | .118 | .035 |

Inventors.
Marvin W. Dundore.
Raymond C. Schneider
By. John W. Darley
Attorney.

INCHES

| | X | .000 | .200 | .400 | .800 | .933 | 1.200 | 1.400 | 1.600 | 2.000 | 2.400 | 2.800 | 3.200 | 3.600 | 3.978 |
|---|---|---|---|---|---|---|---|---|---|---|---|---|---|---|---|
| END RING | $Y_1$ | .054 | .020 | .020 | .132 | .161 | .221 | .260 | .298 | .360 | — | — | — | — | — |
| | $Y_2$ | .054 | .178 | .256 | .256 | .436 | .514 | .566 | .617 | — | — | — | — | — | — |
| CORE RING | $Y_1$ | — | — | — | — | .287 | .273 | .306 | .339 | .390 | .405 | .361 | .268 | .124 | .034 |
| | $Y_2$ | — | — | — | — | .287 | .441 | .522 | .588 | .670 | .660 | .580 | .436 | .250 | .34 |

END RING $a_1$ = 27°
CORE RING $a_1$ = 37°
$a_2$ = 90°
b = .948"
18 BLADES EQUALLY SPACED.

Inventors,
Marvin W. Dundore.
Raymond C. Schneider.

By. [signature]
Attorney.

INCHES

| | | | | | | | | | | | | |
|---|---|---|---|---|---|---|---|---|---|---|---|---|
| X 0.0 | 0.06 | .150 | .300 | .500 | .700 | .900 | 1.100 | 1.300 | 1.500 | 1.700 | 1.900 | 2.026 |
| X .06 | 0.0 | .042 | .178 | .332 | .415 | .443 | .438 | .403 | .340 | .257 | .171 | .153 |
| $Y_2$ .06 | .332 | .505 | .675 | .787 | .827 | .809 | .752 | .661 | .540 | .405 | .261 | .153 |

Inventors.
Martin W. Dundore.
Raymond C. Schneider.
By. John W. Darley
Attorney.

INCHES

| | | | | | | | | | | | | | | |
|---|---|---|---|---|---|---|---|---|---|---|---|---|---|---|
| X | .000 | .050 | .100 | .150 | .200 | .250 | .300 | .350 | .400 | .450 | .500 | .000 | .700 | .801 |
| X | .086 | — | .000 | .007 | .024 | .040 | .054 | .063 | .070 | .073 | .072 | .063 | .039 | .000 |
| $Y_2$ | .086 | .229 | .263 | .280 | .282 | .272 | .259 | .240 | .221 | .200 | .178 | .130 | .077 | .017 |

Inventors.
Marvin W. Dundore.
Raymond C. Schneider.
By. [signature]
Attorney.

Inventors.
Marvin W. Dundore.
Raymond C. Schneider
By. John W. Dailey
Attorney.

Inventors.
Marvin W. Dundore.
Raymond C. Schneider.
By. John O. Darley
Attorney.

Jan. 8, 1963 M. W. DUNDORE ET AL 3,071,928

HYDRAULIC TORQUE CONVERTER

Filed Feb. 14, 1958 15 Sheets-Sheet 15

Inventors.
Marvin W. Dundore.
Raymond C. Schneider.
By. [signature]
Attorney.

3,071,928

HYDRAULIC TORQUE CONVERTER

Marvin W. Dundore and Raymond C. Schneider, Rockford, Ill., assignors to Twin Disc Clutch Company, Racine, Wis., a corporation of Wisconsin Filed Feb. 14, 1958, Ser. No. 715,460
2 Claims. (Cl. 60—54)

Our invention relates to an hydraulic torque converter of the single stage, rotating housing type which is characterized by an improved design.

One object of the invention is to provide an hydraulic torque converter of the single stage, single phase type which is more particularly designed for industrial equipment where it is desired to insure in relation to a connected engine the application of maximum torque over a widely varying load range, such as for crawler tractors, wheeled power shovels, some forms of oil field equipment and kindred devices.

A further object is the provison of a converter of the type indicated which is characterized by a higher stall torque ratio, improved low speed ratio performance, and a more rising impeller torque absorption curve relative to the conventional single stage converter.

A further object is to provide a converter as above in which the toroidal circuit thereof is shaped and arranged in conjunction with positionings and sizings of the impeller and turbine blades to enable the liquid head of the turbine to oppose that of the impeller at speed ratios in excess of 1.0:1.0, thereby effecting a shut off of flow in the circuit, a substantial reduction in the transmitted torque, and a higher turbine speed which is reflected in higher ground speed of a vehicle when the converter is connected thereto.

A further object is to associate with such a converter a cooling system which provides a basic and continuous forced circulation through the converter for heat dissipation and which system is so related to the converter that a sufficiently high pressure is maintained at the impeller inlet to suppress separation of the working liquid particles from the surfaces of the impeller blades under low speed ratio conditions.

These and further objects of the invention will be set forth in the following specification, reference being had to the accompanying drawings, and the novel means by which the objects are effectuated will be definitely pointed out in the claims.

Figure 6:
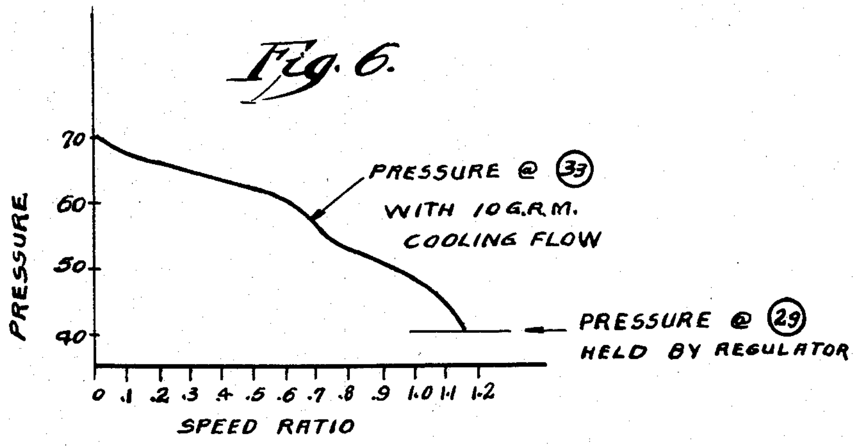

FIG. 6 graphically shows pressure variations at the delivery connection of the cooling system to the converter with changes in speed ratios.

Figure 1:
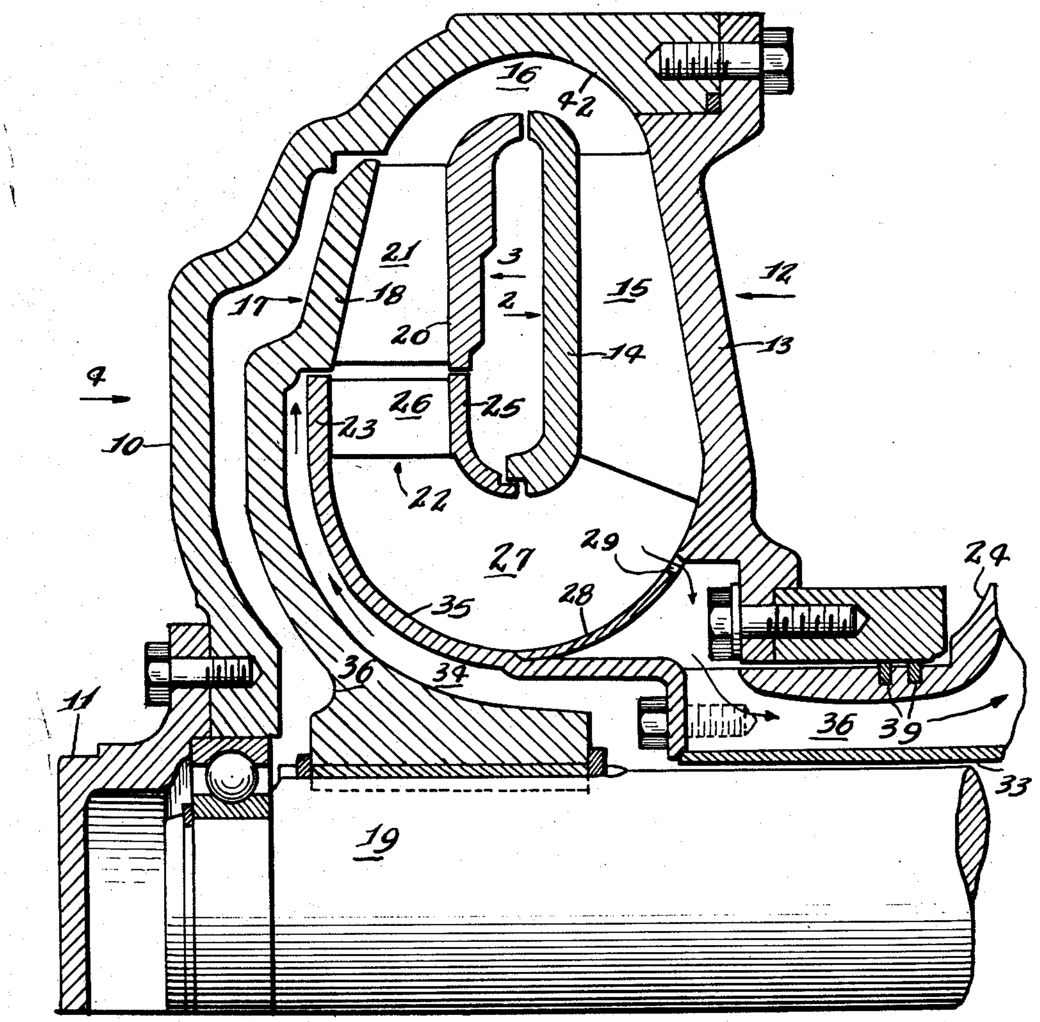
FIG. 1 is a fragmentary, sectional elevation of the hydraulic torque converter.
Figure 2:
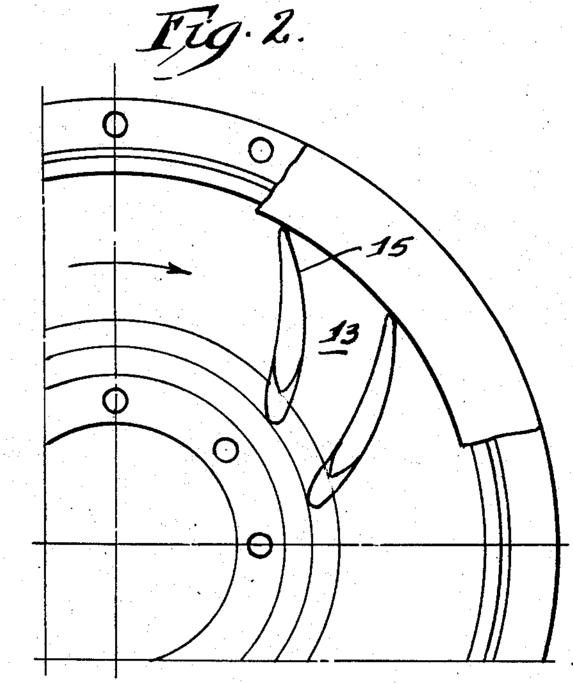
FIGS. 2, 3 and 4 are side elevations as viewed in the directions of the correspondingly numbered arrows in FIG. 1, parts being broken away to show a number of impeller, turbine and stator blades and the several views being to different scales from that of FIG. 1.
Figure 3:
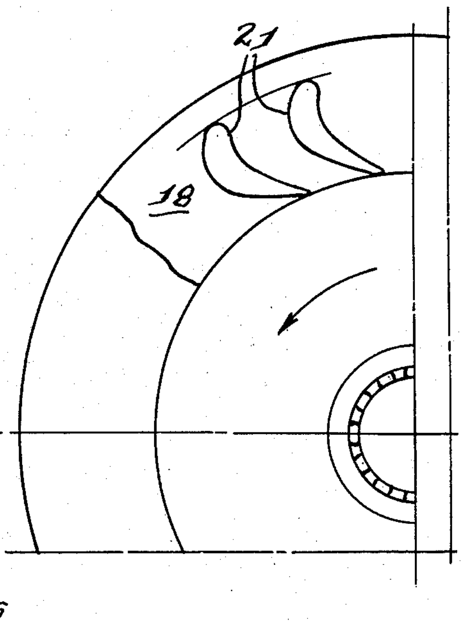
Figure 4:
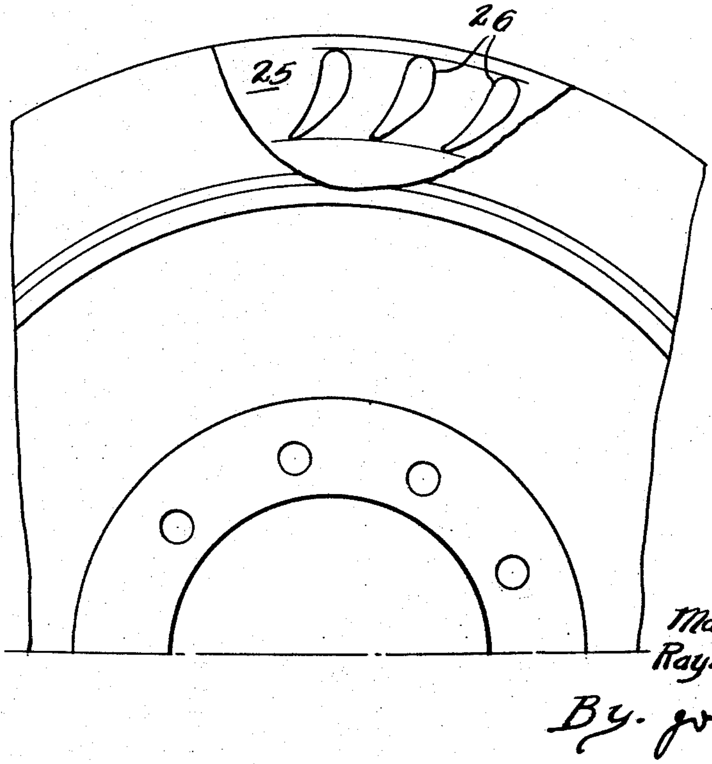
Figure 7:
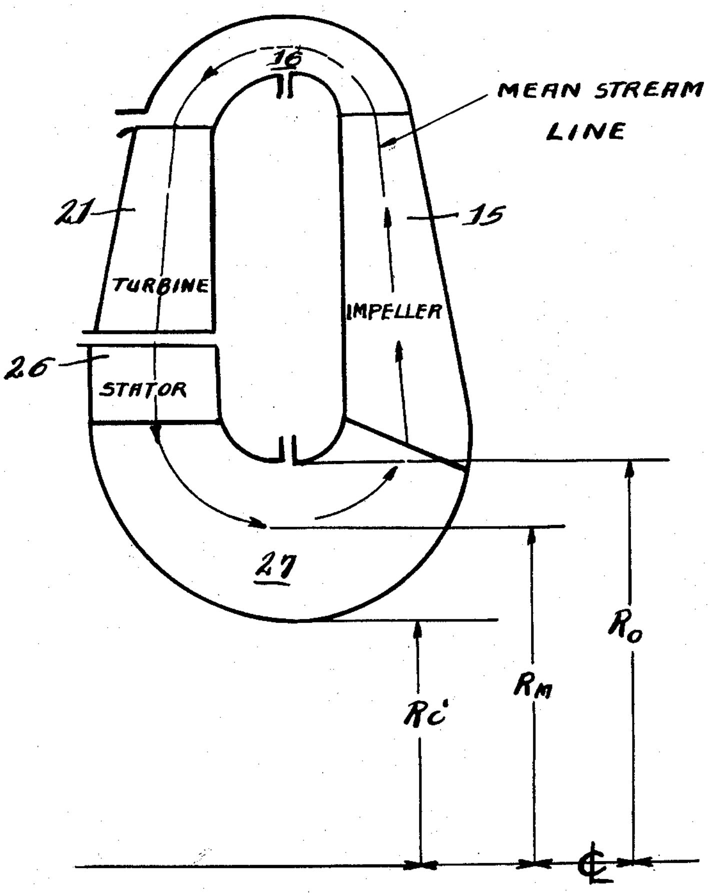

FIG. 7 is a schematic representation of the converter in FIG. 1 showing the shape of the toroidal circuit, the relation of the component bladed members, and the position of the mean stream flow line of the circuit.

Figure 8:
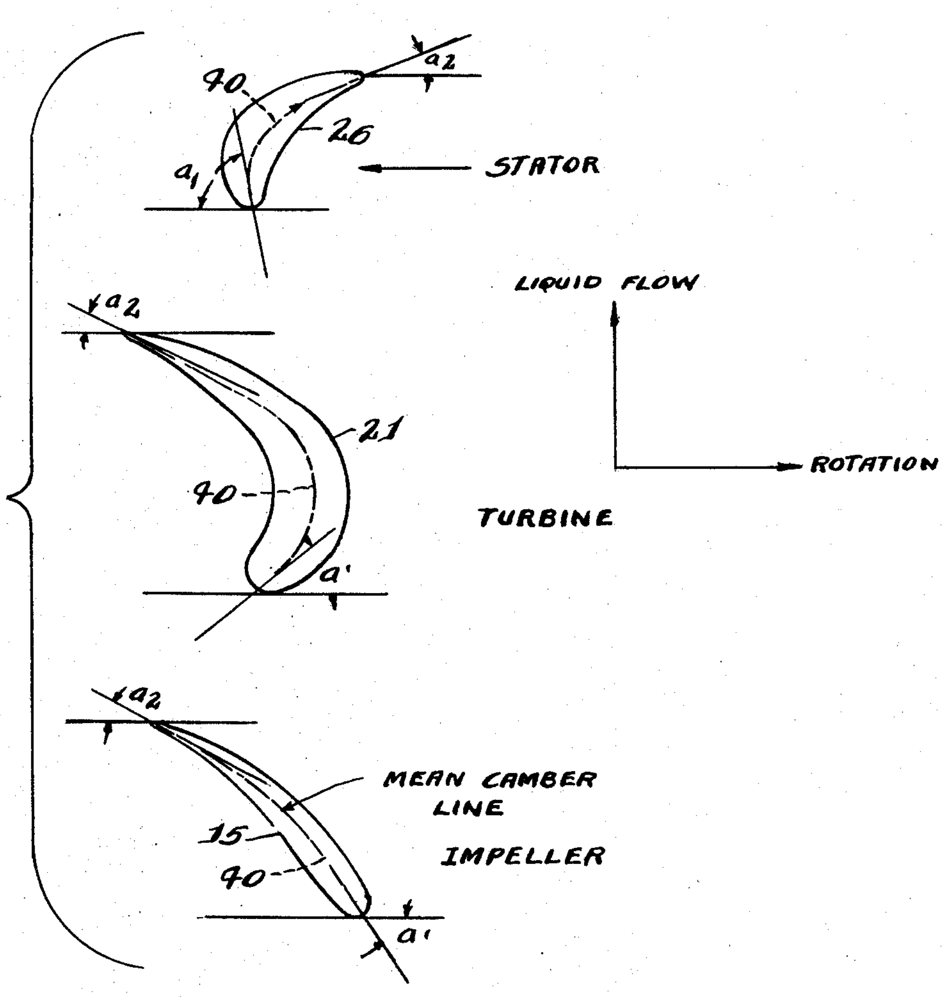
Figure 14:
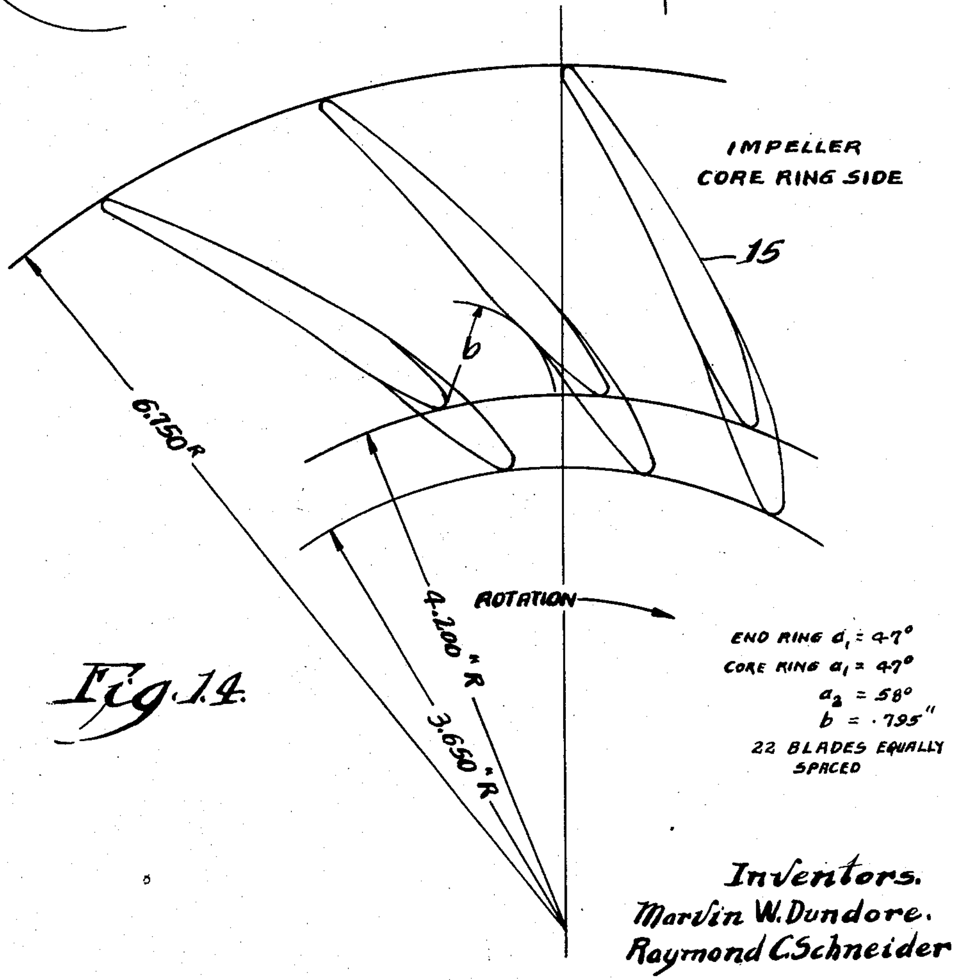
Figure 19:
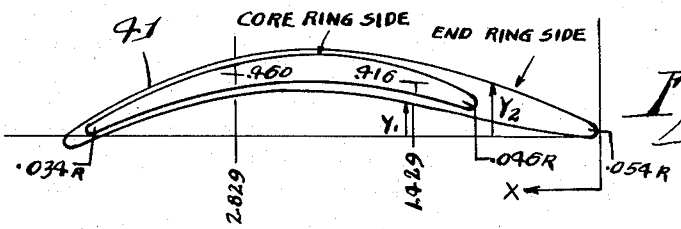

FIG. 8 is an exploded and developed, schematic view showing the relationship and mean stream flow line shapes of the impeller, turbine and stator blades, the impeller blade being of the low capacity type shown in FIG. 14.

Figures 9, 10, 11:
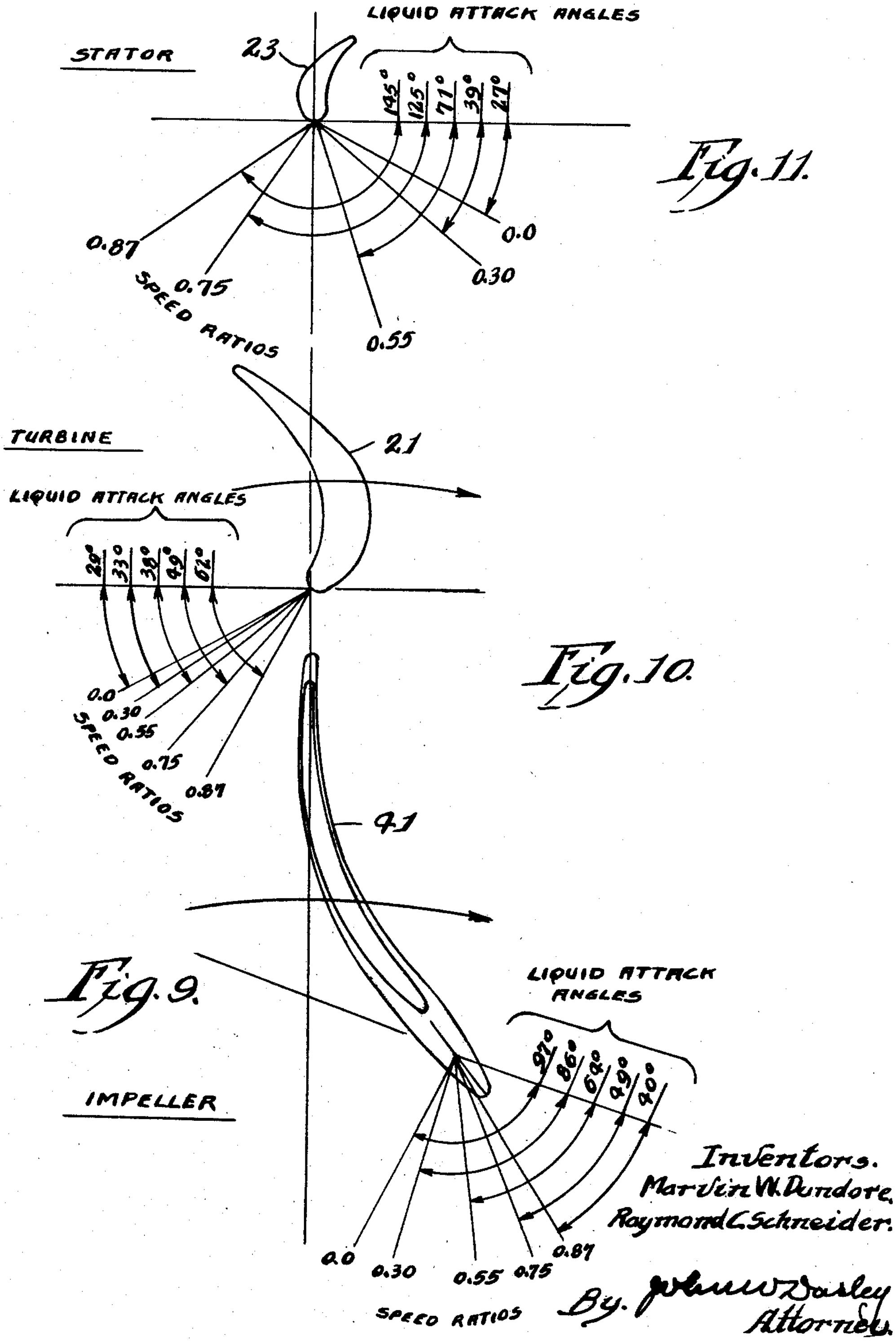
Figures 15, 22:
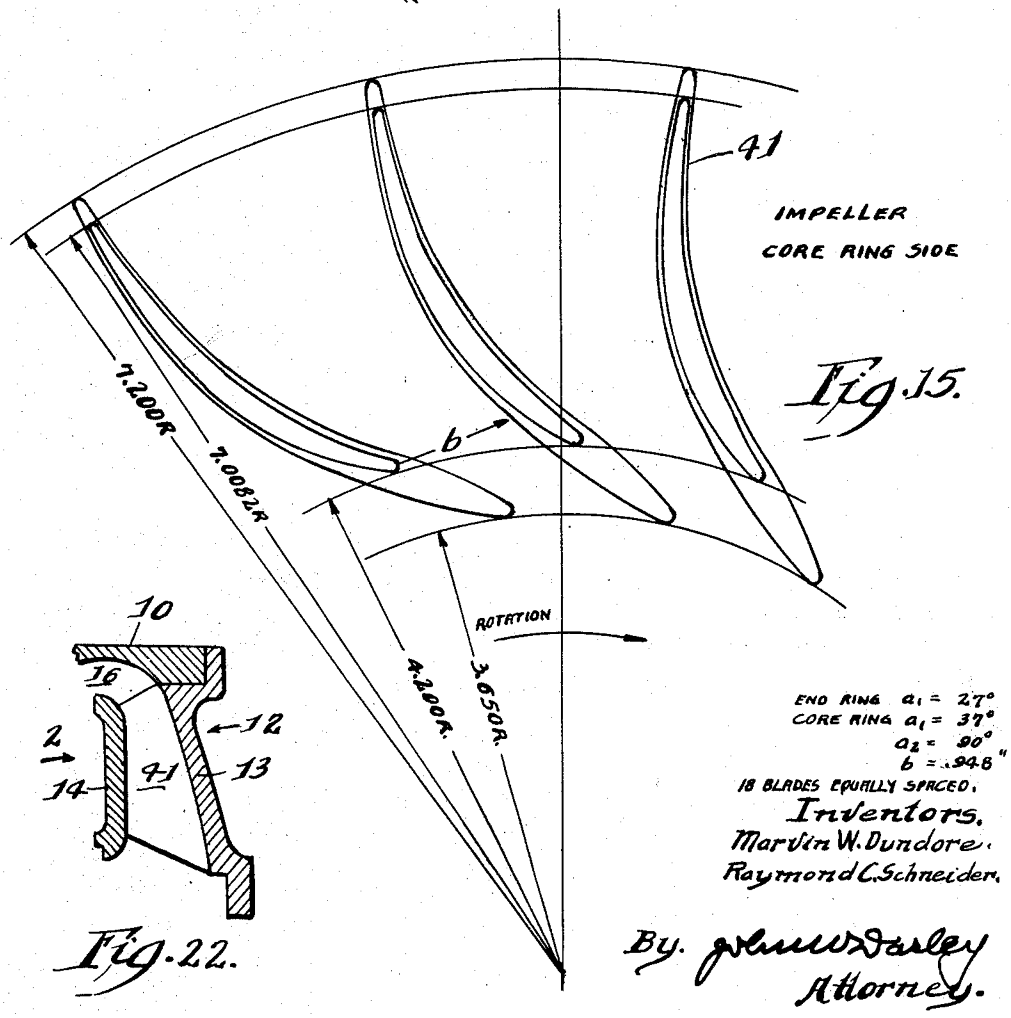
Figure 20:
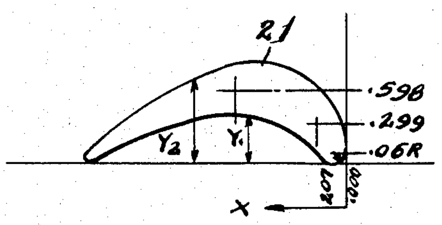

FIGS. 9, 10 and 11 show vectorially the attack angles of the working liquid at indicated speed ratios in relation to the inlet tips of the impeller, turbine and stator blades, respectively, the impeller blade being of the high capacity type shown in FIG. 15.

Figure 12:
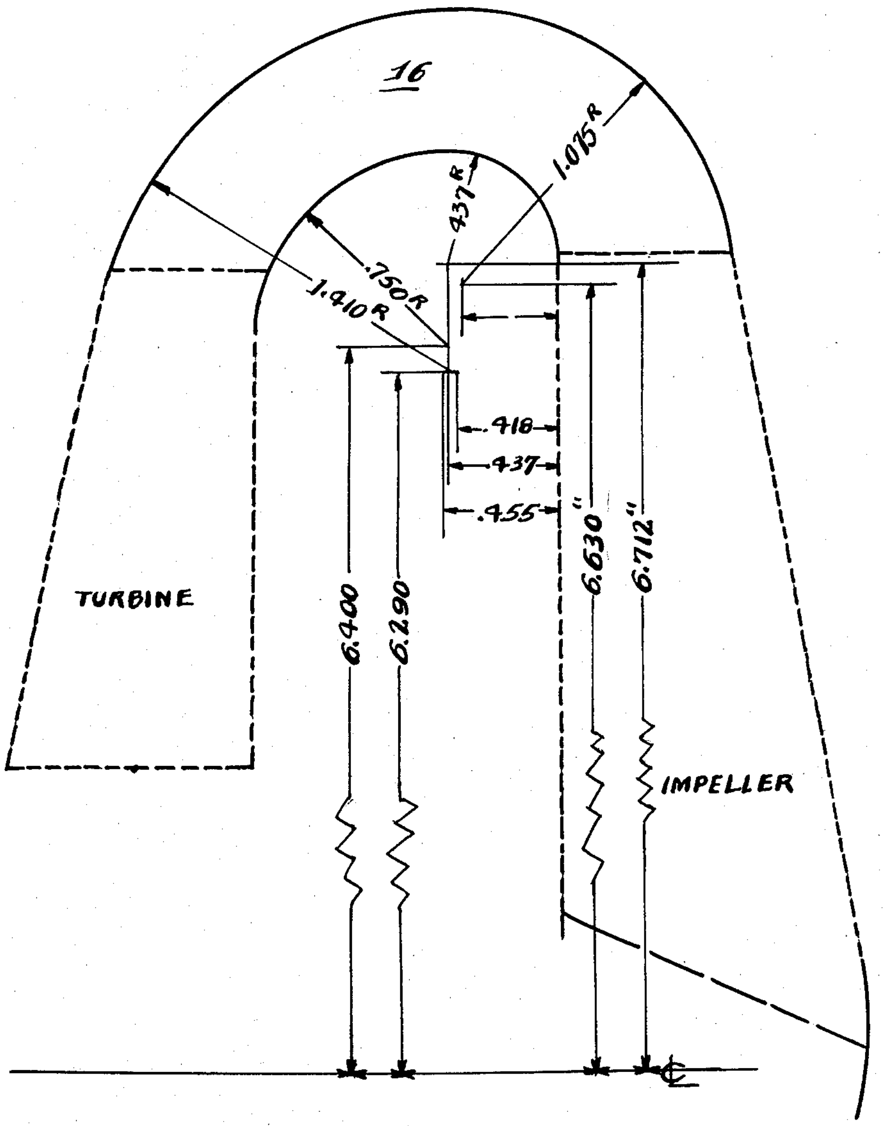
Figure 13:
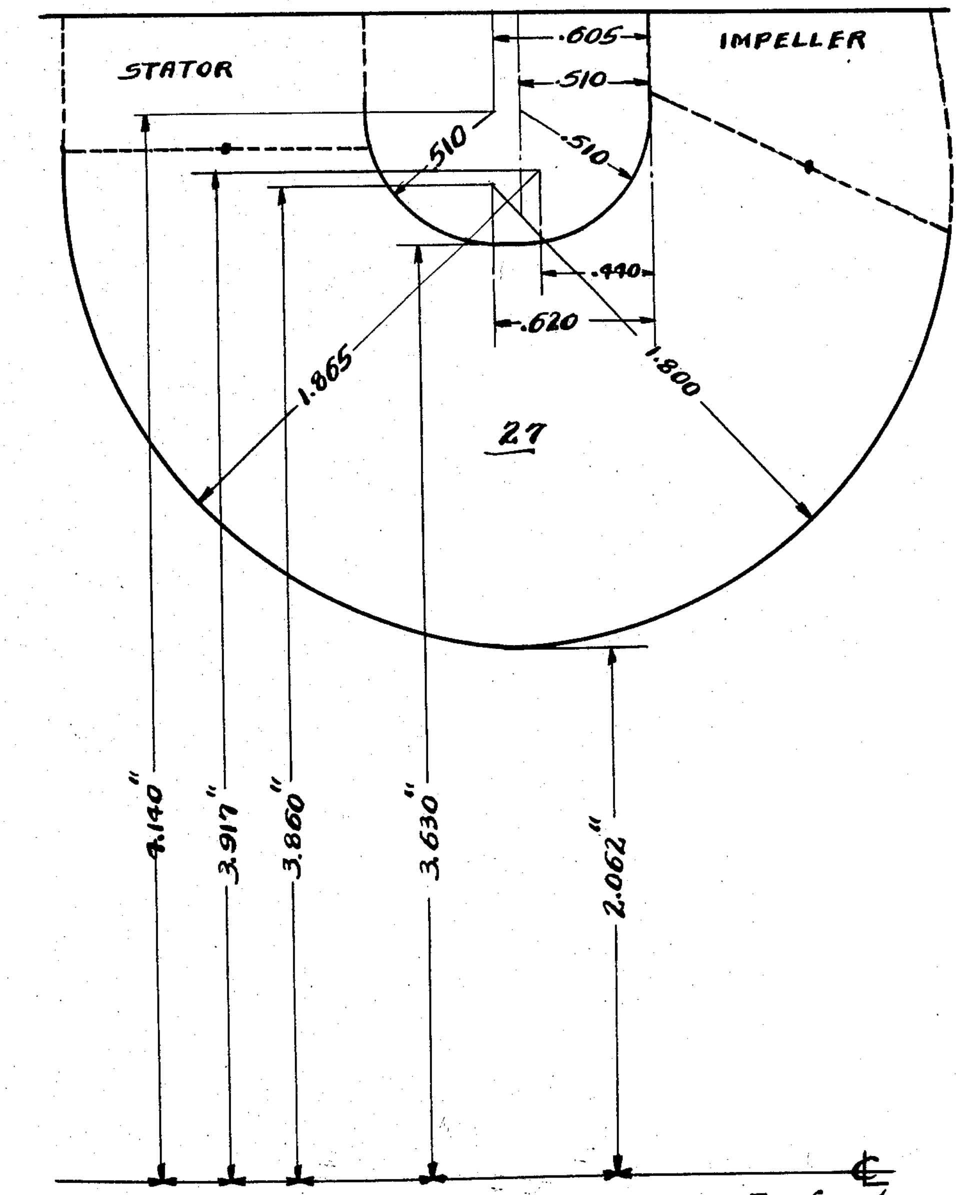
Figure 18:
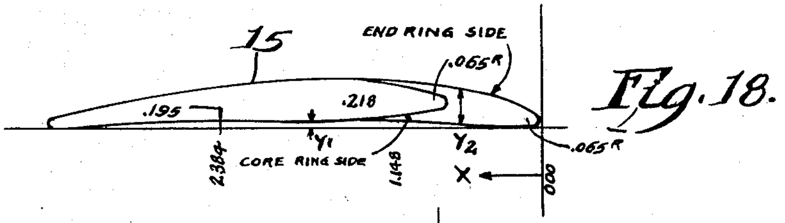

FIGS. 12 and 13 are schematic, dimensional views of the outer and inner, unbladed bends of the toroidal circuit.

FIGS. 14 and 15 are schematic views of relatively low and high capacity, impeller blades, looking in the direction of the arrow 2 in FIGS. 1 and 22, respectively, each with suggested inlet and outlet angles ($a_1$ and $a_2$), the inlet angles being measured at the end and core rings, and a suggested distance ($b$) between the respective impeller blades at their inlets.

Figure 16:
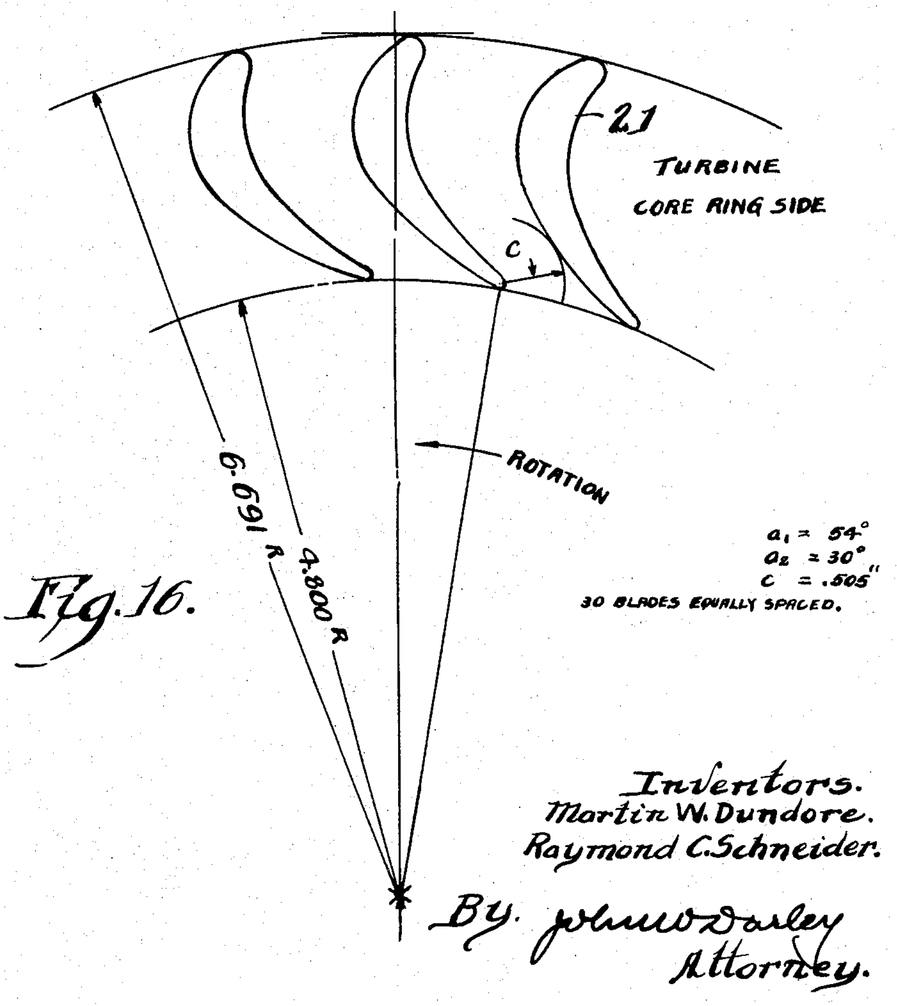
Figure 17:
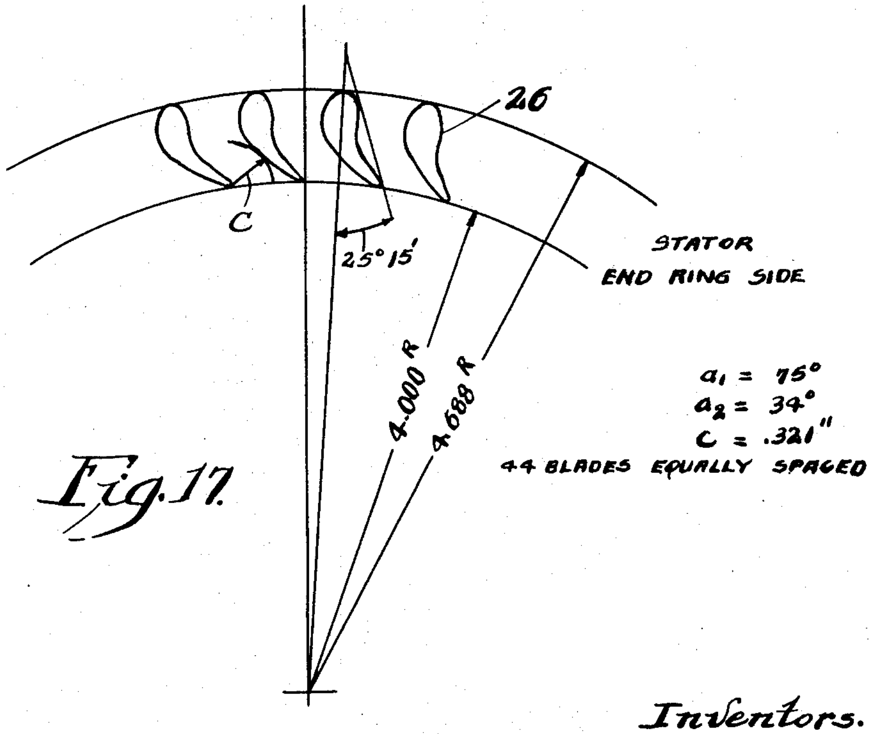

FIG. 16 is a schematic view of several turbine blades looking in the direction of the arrow 3 in FIG. 1, and FIG. 17 is a schematic view of several stator blades looking in the direction opposite to the arrow 4 in FIG. 1, each with suggested inlet and outlet angles ($a_1$ and $a_2$), and a suggested distance ($c$) between the turbine blades and the stator blades, respectively, at their outlets.

FIGS. 18, 19, 20 and 21 are dimensioned views of typical impeller, turbine and stator blades, being related to the comparable blades shown in FIGS. 14, 15, 16 and 17, respectively, the dimensions being tabulated with reference to X- and Y-axes and each blade being considered as lying along the X-axis.

FIG. 22 is a fragmentary, sectional view to reduced scale similar to FIG. 1 and showing a FIG. 15, high capacity blade in the toroidal circuit of the converter as a substitute for the impeller blade 15.

Figure 23:
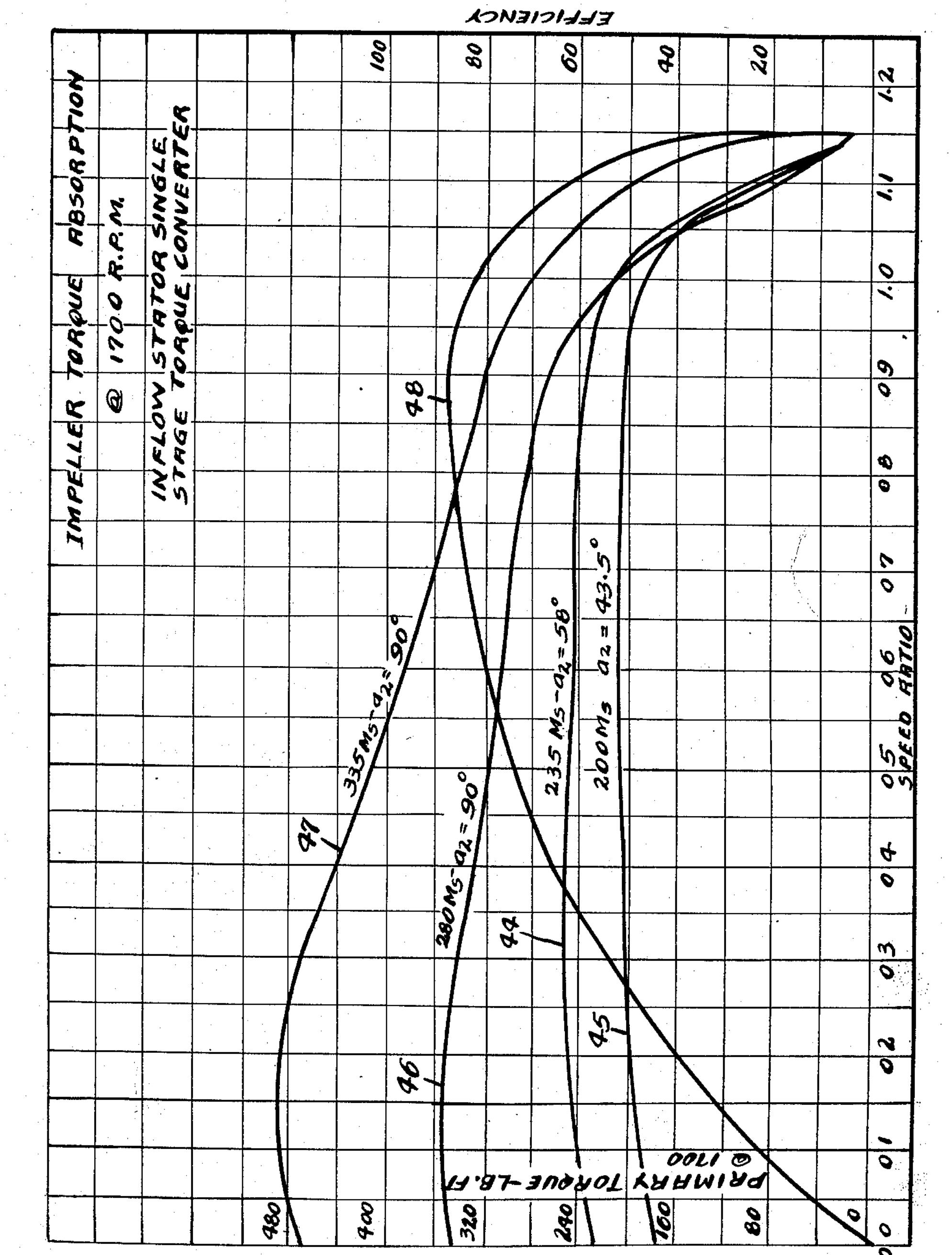

FIG. 23 shows various performance curves of the converter equipped with variant types of impellers.

Figure 24:
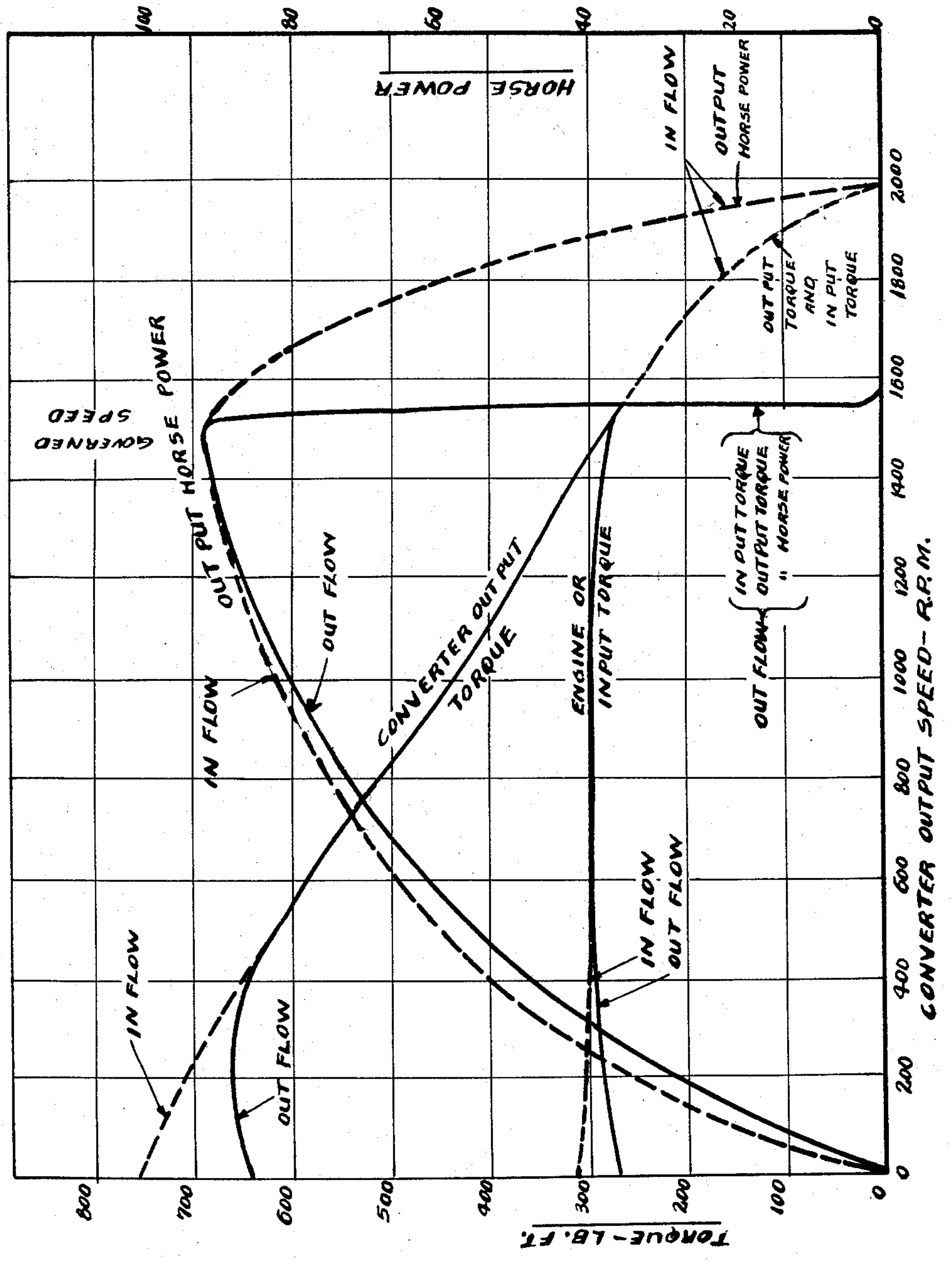
Figure 25:
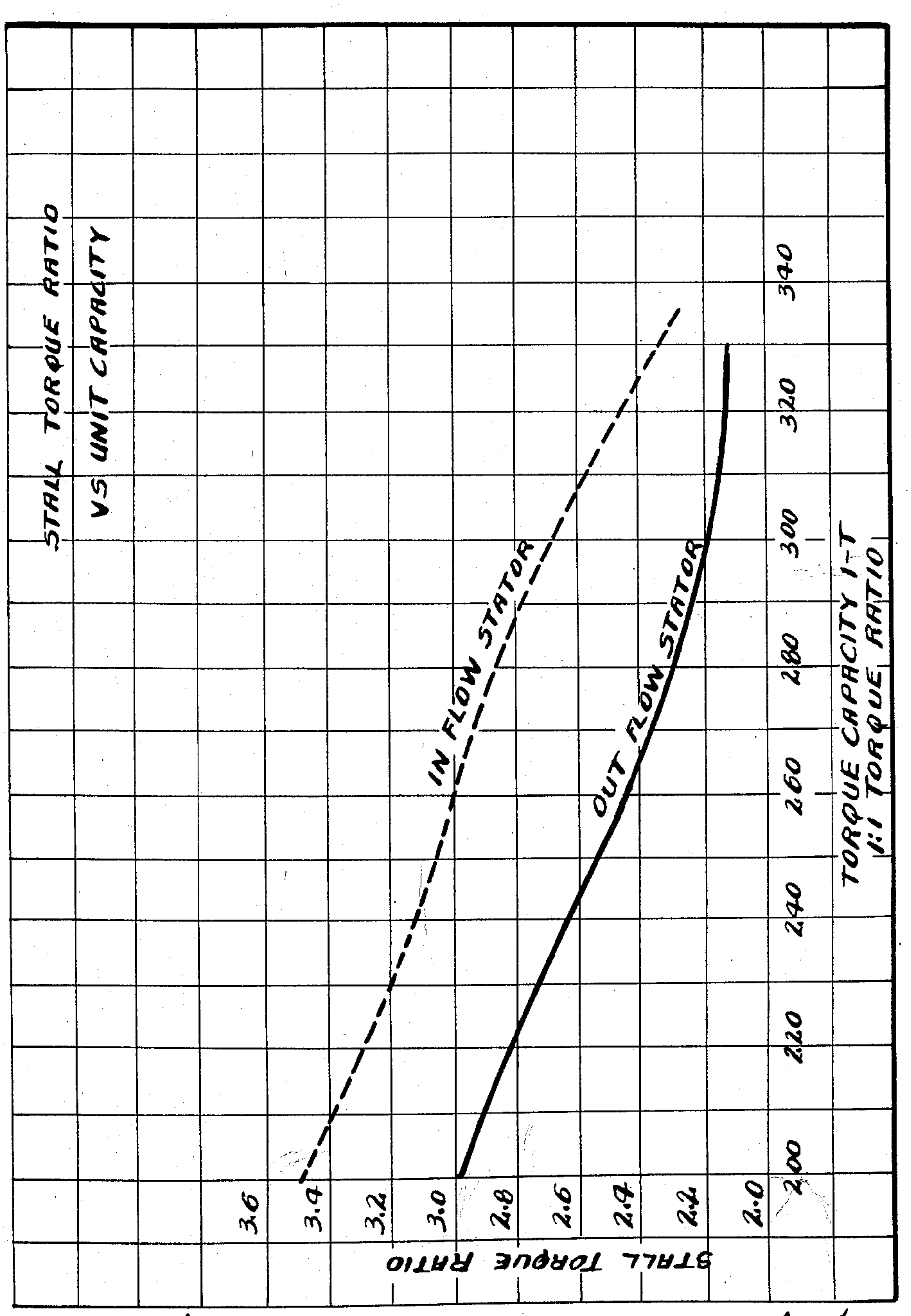

FIGS. 24 and 25 show comparison curves relating in each figure, respectively, to a converter of the radial inflow stator type as described herein where the stator is positioned at the outlet of the turbine, and one of the outflow type where the stator is located at the inlet of the impeller.

Referring to FIG. 1, the numeral 10 designates the rotating housing of the converter which has its opposite ends respectively attached to an annular connector 11 providing a driven connection between a source of power and the impeller 12 which includes an end ring 13, a core ring 14 spaced therefrom, and a plurality of blades 15 equispaced around the end ring 13 and core ring 14 and bridged therebetween.

The discharge from the impeller 12 enters one end of a reversely curved, unbladed, outer passage 16 whose opposite end connects with the inlet of a turbine 17 which includes an end ring 18 having splined connection with a load shaft 19, a core ring 20 spaced from the end ring 18, and a plurality of blades 21 equispaced around the end ring 18 and core ring 20 and bridged therebetween.

The discharge from the turbine 17 enters the closely adjacent inlet of a stator 22 which includes an end ring 23 connected to a stationary sleeve 24 coaxial with and spaced from the shaft 19, a core ring 25, and a plurality of blades 26 equispaced around the end ring 23 and core ring 25 and bridged therebetween.

The discharge from the stator 22 enters one end of a reversely curved, unbladed, inner passage 27 whose opposite end connects with the inlet of the impeller 12. The inner part of the passage 27 is defined by appropriately curved portions of the core rings 14 and 25 while the outer part of the same passage is defined by appropriately curving a portion of the stator end ring 23 and securing thereto one end of a curved baffle 28 whose opposite end terminates short of the end ring 13 to provide an opening or port 29 for a purpose presently explained.

As shown in FIG. 1, the impeller 12, passage 16, turbine 17, stator 22 and passage 27 are related to provide a closed, toroidal path for the working liquid except that, as presently described, the liquid also flows through an external and connected cooler. Generally speaking, the impeller blades 15 occupy positions in the radial outward flow part of the toroidal circuit, while the turbine blades 21 and stator blades 26 occupy positions in the radial inward flow part of this circuit. The impeller blades 15, turbine blades 21 and stator blades 26 are normally related to the end and core rings 13 and 14, 18 and 20, and 23 and 25, all respectively.

The shape of the toroidal circuit in relation to the locations of the several blades is an important phase of the invention and its advantages will be subsequently discussed in the development of the operative characteristics of the converter. For the present, it will be noted that the blade contacting faces of the core rings 20 and 25 are coplanar and transverse to the axis of the converter, and that the like face of the core ring 14 is also transverse to the same axis. Further, the end ring 13 along the impeller blades 15 is convergingly related to the core ring 14, while the end ring 18 is divergingly related to the core ring 20, both in the direction of liquid flow. The blade contacting faces of the end ring 23 and core ring 25 for the stator 22 are parallel.

The passages 16 and 27 are generally U-shaped or substantially semi-circular and hence effect a 180° change in direction of the liquid flow between the impeller 12 and turbine 17, and between the stator 22 and impeller 12, respectively. Further, these passages are arranged to provide easy and non-turbulent direction changes in the liquid flowing therethrough to thereby prevent separation of the liquid from the walls of the passages. The requirements for effecting these results will be subsequently discussed.

An important feature of the invention is the manner of dissipating a substantial part of the heat developed in the working liquid while moving through the toroidal circuit by flowing this liquid through an external cooler under specified control and of accomplishing this result in a way that additionally maintains sufficient pressure on the liquid moving between the impeller blades to substantially reduce any tendency of the liquid particles to separate from the surfaces of these blades during operation in the low speed ratio range. Such separation, if not suppressed, is accompanied by a material energy loss.

As will be subsequently developed more in detail (see FIGS. 9 and 10), the liquid attack angles on the mean stream flow lines of the blades vary with the speed ratios of the turbine 17 and impeller 12, speed ratio being defined as the speed of the turbine divided by that of the impeller. At relatively high speed ratios or in the high efficiency range, the liquid flows favorably between and in the direction of the mean camber line of the impeller blades 15, but as the turbine 17 slows down with increasing load, the liquid would enter the impeller 13 at less favorable and larger angles with the mean camber line of the impeller blades 15. Over this relatively low speed ratio range and, as generally referred to above, the liquid particles tend to separate from the surfaces of the impeller blades 15 with energy loss.

It has been determined that if a sufficiently high pressure is maintained on the liquid at the impeller inlet, this separating tendency can be materially suppressed with an accompanying improvement in efficiency and the arrangement for effecting this result is incorporated in the forced cooling system.

Figure 5:
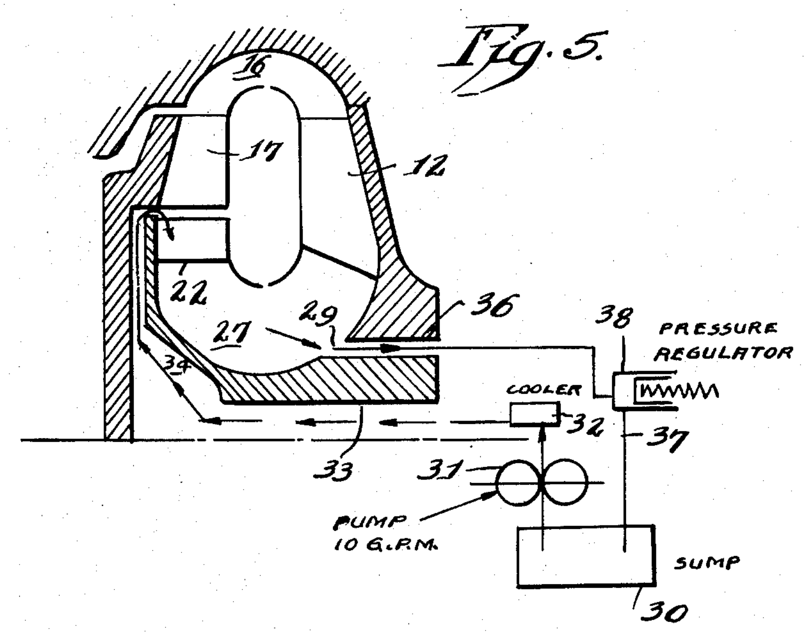
FIG. 5 is a schematic view, partly in section, of the converter and associated cooling system.

A schematic representation of the cooling circuit is shown in FIG. 5 to which and to FIG. 1 reference will now be made. The working liquid is withdrawn from a convenient sump 30 by an engine driven pump 31 and thence flows serially through a cooler 32, an annular passage 33 (see FIG. 1) included between the shaft 19 and sleeve 24, and a passage 34 included between the curved portion 35 of the stator end ring 23 and an extension 36 of the turbine end ring 18 which is keyed to the shaft 19. Liquid delivered by the passage 34 enters the toroidal circuit between the outlet of the turbine 17 and the inlet of the stator 22. The cooling flow discharges from the toroidal circuit through the opening 29 and flows through a passage 36$a$ in the sleeve 24 and a connecting pipe 37 to the sump 30. The pipe 37 includes a conventional pressure regulating valve 38 which, in the present instance, is preferably set to maintain a pressure of 40 p.s.i. at the inlet to the impeller 12. It has been determined that this constant pressure is adequate to suppress the separating tendency of the liquid particles from the impeller blades 15 when the converter is operating at relatively low speed ratios.

A further important feature is the cooling flow direction with respect to the flow in the toroidal circuit. Since the impeller 12 and turbine 17 are located, respectively, in the radially outward and inward flow portions of the toroidal circuit, it will be apparent that, and as subsequently developed further, at some relatively high speed ratio, the liquid thrust by the turbine 17 will oppose that of the impeller 12 and toroidal circulation will cease. As the turbine slows down, toroidal circulation increases and opposes that of the liquid moving through the passage 34 so that the pressure at the delivery end of the passage rises. However, under either a toroidal or a non-toroidal circulation, a basic suppressing pressure of 40 p.s.i. is maintained at the inlet to the impeller 12. This pressure is adequate enough for the primary purpose as stated, but is not so high, even at low speed ratios, to cause excessive leakage at the usual seals exemplified by the numeral 39. The pressure situation for varying speed ratios at the delivery end of the passage 34 is graphically shown in FIG. 6, pressure at the delivery end of this passage rising with a decrease in the speed ratio.

The operating characteristics of the FIG. 1 converter are related to the shape of the toroidal circuit as schematically shown in FIG. 7, the respective shapes, inlet and outlet angles of the impeller, turbine and stator blades, and the number of blades in each blade group. The considerations subsequently discussed, including the blade inlet and outlet angles, liquid attack angles and radii are with reference to the mean stream flow line of the toroidal circuit and respective blades as indicated in FIG. 7. The location of the mean stream flow line at any given point in the flow path is determined by the following formula as graphically indicated for the inner curved and unbladed passage 27 in FIG. 7:

$$R_m=\sqrt{\frac{R_i^2+R_o^2}{2}}$$

wherein $R_m$=mean radius of a point on the mean stream flow line $R_i$ and $R_o$=inner and outer radius, respectively, of points on the end of a line substantially perpendicular to the torus walls through the point on the mean stream flow line.

A converter embodying the inventive features disclosed herein is characteristically employed with a governed, internal combustion engine and, by way of example, this engine will be considered as of the diesel type. Design requirements are based on the relation between the characteristic torque and horsepower curves of a given engine and the characteristic primary torque curve of the converter disclosed herein for such an engine. The primary torque of a converter is defined as that which is required to turn the impeller at any given speed as the speed of the turbine varies from stall (0.0) to racing (1.0), both in terms of speed ratio. As subsequently detailed, the instant design also achieves speed ratios in excess of 1.0.

Generally speaking, additional features of the disclosed, single stage converter compared to a conventional converter having the same stage number is an increase in the stall torque ratio (see FIG. 25), better low speed ratio performance (see FIG. 24), and a more rising impeller torque absorption curve (see FIG. 23). These results are accomplished by placing the stator 22 (see FIG. 1) immediately adjacent the outlet of the turbine 17, i.e., the stator 22 is positioned in the radial inflow part of the toroidal circuit. In this location, the stator 22 is able to accept with maximum efficiency liquid discharged from the turbine 17 at any speed thereof and reaction torque is effected under the most favorable flow conditions.

The design details for accomplishing the foregoing and other results will now be described. Referring to FIG. 8, there is shown in exploded and developed relation characteristic shapes of the blades in the several stages of the converter and along their mean stream flow lines. The inlet and outlet angles for each blade are designated as "$a_1$" and "$a_2$," respectively, and for the impeller blade 15, the inlet angle is defined as the angle between the tangent to the mean camber line 40 and the tangent to the circle indicated by the radius of rotation of the impeller blade 15 at its inlet tip. The same principle applies to the outlet angle of the impeller blade 15, and to the inlet and outlet angles of the turbine blade 21 and the stator blade 26. The impeller blade shown in FIG. 8 is the same as that respectively shown in FIGS. 1 and 14.

Generally speaking, the blade shapes have been designed to provide efficient liquid flow over a wide range of speed ratios. For this purpose, the blade development has been such as to secure high efficiency at the maximum theoretical design point and to accept flow at a number of attack angles with a minimum of shock loss due to separation of the liquid from the blade surfaces with a resulting reduction in efficiency loss, flow over the blades being smooth. The latter characteristic is influenced by the cooling flow arrangement shown in FIG. 5. Blade design directly determines the capacity, efficiency and other operational characteristics such as the torque ratio at stall, the shape of the torque curve and the speed ratio at which peak efficiency occurs.

The impeller blade 15, as shown in FIGS. 8 and 14, appears in the toroidal circuit of the converter in FIG. 1 and is designated as the relatively low capacity impeller blade. A relatively higher capacity impeller blade 41, shown in FIGS. 9 and 15, appears in the toroidal circuit of the converter as indicated in FIG. 22. Graphic representations of these blades will be subsequently set forth. While the impeller blades 15 and 41 are specifically shown as respectively having convex and concave leading faces, it will be understood that the impeller blade may be either convex or concave. As the outlet angle of the impeller blade is increased, the higher is the torque absorption capacity as any given input speed. The inlet angle of the impeller blade is determined by the approaching flow direction of the working liquid, the amount of flow and the outlet angle of the stator preceding the impeller. Within these ranges of variables, the impeller blade, for any given design, would be shaped to effect a smooth transition in the blade profile from the inlet to the outlet of the blade.

Considering a converter equipped with the relatively high capacity, impeller blades 41, turbine blades 21 and stator blades 23, and with an appropriate number of blades in each instance (ranges subsequently indicated) to produce a unit having a relatively high specific torque, there are schematically shown in FIGS. 9, 10 and 11 certain suggested structural characteristics of the respective blades.

Referring to FIG. 9, the inlet tip of the impeller blade 41 is designed to accept liquid moving through the inner, reversely curved passage 27 (see FIG. 1) over an angular dispersion of from 40° to 97° as indicated by the approach velocity vectors which are related to a speed ratio range of from 0.0 to 0.87 and may be considered in connection with the primary torque curve 47 shown in FIG. 23.

The dispersion of the approach velocity vectors at the inlet tips of the turbine blades 21 and of the stator blades 23 (see FIGS. 10 and 11) for the same speed ratio range as the impeller blade 41 is from 40° to 97° for each turbine blade 21 and 27° to 145° for each stator blade 23. The position of the bulbous nosed, stator blades 23 directly at the outlets of the turbine blades enables the stator blades to accept this relatively large dispersion from the turbine blades in all streamlines with maximum efficiency.

The best performance characteristics for the several blades have been obtained with a range of inlet and outlet angles, "$a_1$" and "$a_2$," respectively, as follows:

| | Inlet Angles, degrees | Outlet Angles, degrees |
|---|---|---|
| Impeller Blades | 25 to 48 | 36 to 90 |
| Turbine Blades | 32 to 65 | 22 to 35 |
| Stator Blades | 74 to 85 | 29 to 39 |

Considering the operating characteristics of the converter as shown in FIG. 1, i.e., with impeller blades 15 (see FIGS. 8 and 14), flow through the impeller 12 and turbine 17 is generally radially outward and inward, respectively, of the converter. In other words, the respective impeller and turbine blades 15 and 21 are positioned in the toroidal circuit so that at some determined speed ratio, the liquid head of the turbine 17 opposes that of the impeller 12 to thereby effect a cessation of flow through the working circuit and a substantial reduction in the transmitted torque.

The blades in the several stages are positioned at right angles to their respective core and end rings as shown in FIG. 1 and are not twisted between their inlet and outlet tips. Further, in the usual type of construction involving a radial outflow impeller and a radial inflow turbine, it is well known that the minimum distance and hence area between a pair of adjacent impeller blades occurs at the inlet between these blades and that this channel area increases towards the blade outlets, whereas the reverse is true for the turbine. Therefore, in this known type of impeller, the relative velocity head of the liquid decreases and its pressure head increases as the liquid flows outwardly between the impeller blades in accordance with the law governing flow of liquid through a conduit. The reverse situation occurs in the known radial inflow turbine, i.e., from inlet to outlet, the relative velocity head increases and the pressure head decreases.

Since it is only the kinetic energy imparted to the working liquid by the impeller that has value in exerting a rotational force on the output shaft, it is advantageous to reduce the pressure head development as much as possible. In the present converter, this has been accomplished by contracting the boundary walls of the impeller flow channels from the inlet to the outlet of the impeller 12 and, specifically, by relatively converging the end and core rings 13 and 14, respectively, as shown in FIG. 1. By this arrangement, the increase in each flow channel area in the impeller 12 from the inlet to the outlet thereof may be limited up to about 30% of what it would otherwise be.

In the turbine 17, the boundary walls constituted by the end and core rings 18 and 20, respectively, relatively diverge from the inlet to the outlet and limit the area decrease between the blades up to about 25%.

For the stator 22, the end and core rings 23 and 25, respectively, are parallel in the regions of their abutment to the stator blades 26 and the latter are related to limit the area decrease from their inlet to the outlet to about 20%.

Figure 21:
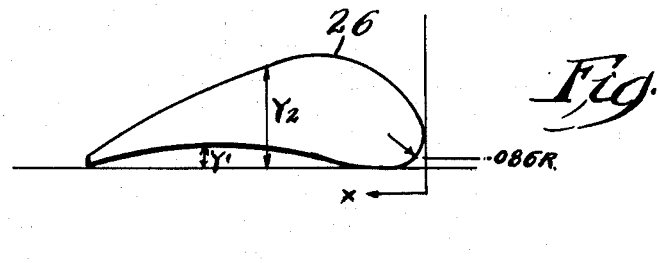

Typical dimensions for the outer and inner, reversely curved and unbladed passages 16 and 27 are shown in FIGS. 12 and 13, all respectively, and are to be considered in conjunction with the specimen impeller blades (FIGS. 14 and 18), turbine blades (FIGS. 16 and 20), and stator blades (FIGS. 17 and 21). For the purpose of preventing separation of the liquid from the walls of the passages 16 and 27 and subsequent energy losses, the transverse area of the outer or high energy passage 16 is preferably reduced 10 to 15% from the outlet of the impeller 12 to the inlet of the turbine 17, while the inner or low energy passage 27 has its comparable area preferably held constant from the outlet of the stator 22 to the inlet of the impeller 12, or it may be slightly and gradually decreased in the same direction.

From the foregoing and considering the outer and inner, reversely curved passages 16 and 27, respectively, in conjunction with the converging and diverging flow channels in the impeller and turbine 12 and 17, respectively, it is apparent that the outer peripheral profile of the toroidal circuit is substantially pear-shaped.

An important feature of the invention is that the cessation of flow in the toroidal circuit, as above referred to, occurs at some speed ratio in excess of 1:1. This result is achieved by substantially increasing the working liquid mass rotated by the impeller 12 relative to that which is included within the turbine 17 and as generally determined by the relation of the inner and outer diameters of the liquid masses in the impeller and turbine, respectively.

Referring to FIG. 1 which exemplifies one structural arrangement, the working liquid mass rotating at the speed of the impeller 12 is generally included between the inlet tips of the impeller blades 15 and the outer surface 42 of the outer passage 16, while the liquid mass rotating at the speed of the turbine 17 is generally included between the inlet tips of the stator blades 26 and the inlet tips of the turbine blades 21. It will be apparent that the liquid mass of the impeller 12 is substantially greater than that of the turbine 17 so that, when liquid flow through the toroidal circuit ceases for reasons noted above, this can happen only because the turbine speed exceeds that of the impeller. Speed ratios of as high as 1.15 at flow shut-off have been achieved by this arrangement.

Typical primary torque curves for the above converter are shown in FIG. 23. One such curve is identified by the numeral 44 for a converter having a specific torque of 235 pds. ft. and employing the dimensioned impeller blade 15 shown in FIGS. 14 and 18, the dimensioned turbine blades 21 shown in FIGS. 16 and 20, and the dimensioned stator blades 26 shown in FIGS. 17 and 21. For this specific design, the impeller 12 includes twenty-two blades, the turbine 17 has thirty blades, and the stator 22 includes forty-four blades, all blades being equally spaced around their respective members.

Other primary torque curves in FIG. 23, denoted by the numerals 45 and 46, indicate the characteristics of converters having specific torques of 200 pds. ft. and 280 pds. ft., and impeller blade outlet angles "$a_2$" of 43.5° and 90°, all respectively. Curves 44, 45 and 46 also indicate the effect on the torque absorption capacity of the impeller of varying the outlet angles "$a_2$" of its blades; increasing the outlet angle increases this capacity at a given input speed.

A variant arrangement which retains the higher than 1:1 speed ratio factor and results in a still higher and a more rising torque absorption curve involves the use of the relatively high capacity blades 41 (see FIG. 15) in the impeller 12. In FIG. 22 is shown a blade positioned in the impeller and by comparison with the blade 15 in FIG. 1, it will be apparent that the outlet tip of the blade 41 extends partially into the outer passage 16 and that such tip has a larger radius than the outlet tip of the blade 15. Employing the dimensioned impeller blade 41 shown in FIGS. 15 and 19 to the number of eighteen blades with the turbine blades 21 and stator blades 26 as related above for the FIG. 1 converter provides the torque absorption curve 47 shown in FIG. 23, the converter being matched to a 335 pds. ft. engine. The efficiency curve, denoted by the numeral 48 in FIG. 23, relates to the torque absorption curve 47 and exemplifies the ability of the converter to provide high efficiency over a wide range of output speeds.

Depending on the size of the converter, the number of impeller blades range from 18 to 24, those of the turbine from 24 to 30, and those of the stator from 40 to 48, and these blade ranges are tied in with the ranges of inlet and outlet angles tabulated above.

In any of the converters described and referring to FIG. 23, it will be noted that when flow shut-off in the toroidal circuit occurs at a speed ratio of 1.15:1, the input torque does not quite reach zero due to the fixed stator blades 26 and mechanical input losses.

As mentioned generally above, additional objects of the disclosed converter are improved low speed ratio performance and a higher stall torque ratio, both with reference to single stage converters of conventional design.

For low speed ratio performance, reference will be had to FIG. 24 which graphically shows by way of comparison certain performance characteristics of a single stage converter equipped with a radial inflow stator and one including a radial outflow stator. The characteristics selected are engine or input torque, converter output torque and output horsepower. The several inflow curves are shown dotted and the several outflow curves are shown full.

As diesel engines are lugged down from the governed speed, the engine torque rises from 15 to 25% depending on engine design, this factor being inherent in this type of engine. Hence, assuming that a converter is matched to a diesel engine, it will be apparent that as the engine slows due to an increase in load on the turbine and a decrease in speed of the latter, i.e., in the low speed ratio range, the full torque capabilities of the engine will be realized and the maximum torque will be available to move the load. This characteristic is highly desirable in certain types of vehicles including crawler tractors and industrial wheeled shovels and some oil field equipment where there are widely varying load demands.

Considering FIG. 24, it will be obvious that the input or primary torque curve for a single stage converter having a radial outflow stator (full line) is relatively flat, while that for a similar converter having an inflow stator (dotted line) rises in the direction of stall with an accompanying increase in the engine torque, the respective converters being regarded as having comparable capacities. As to output torque, the inflow stator converter (dotted line) provides a considerable excess over the outflow stator type (full line) in the direction of stall and this condition is partly due to the rising torque characteristic as discussed above. Considering the output horsepower curves, FIG. 24 shows that the inflow stator type (dotted line) provides more horsepower over a wider range of turbine speeds, i.e., vehicle ground speeds, than the outflow stator type (full line). The outflow stator converter is generally designed to limit the output speed at some speed ratio less than 1:1 and so decreases the horsepower rapidly, but the inflow stator unit carries to higher speed ratios in excess of 1:1 and hence enables the vehicle to move greater loads at higher ground speeds.

Comparison curves relating to stall torque ratio for the inflow and outflow stator units are shown in FIG. 25. The inflow stator (dotted line) provides substantially more torque multiplication at stall than does the outflow stator (full line) which is reflected in more output torque since the latter is the product of the input torque and the torque multiplication ratio.

We claim.

1. An hydraulic torque converter of the single stage type comprising a rotatable, bladed impeller, a rotatable, blade turbine, and a bladed stator arranged to form a toroidal circuit including radial outward and inward flow portions connected by U-shaped, outer and inner unbladed passages, the impeller being located in the outward flow part of the circuit and the turbine and stator being located in the inward flow part of the circuit with the outlets of the turbine blades being disposed closely adjacent the inlets of the stator blades, the impeller blades bridging between a first core ring and a first end ring convergingly related in the direction of flow, the turbine blades bridging between a second core ring and a second end ring divergingly related in the direction of flow, and the stator blades bridging between parallel, third core and end rings, the impeller and turbine blades and associated core and end rings being related to limit the increase in the flow channel area between the inlet and outlet of each adjacent pair of impeller blades and the decrease in flow channel area between the inlet and outlet of each adjacent pair of turbine blades up to about 30% and 25%, all respectively, of that determined by a parallel relationship of such rings, and the stator blades being related to limit the flow channel area decrease therebetween to about 20%, the number of impeller, turbine and stator blades ranging respectively from 18 to 24, 24 to 30, and 40 to 48 the radial dimension of each turbine blade being substantially greater than the mean axial dimension thereof and also substantially greater than the radial dimension of each stator blade and the radial dimension of each stator blade being substantially less than the axial dimension thereof and the inlet and outlet angles of each blade at the mean stream flow line of the circuit are measured respectively between the tangents to the mean camber line of the blade at its inlet and outlet tips and the tangents to circles determined by the radii of the inlet and outlet tips of the blade, the impeller and turbine blades and the stator blades being inclined counter to and in the rotation direction of the impeller, respectively, the inlet and outlet angles for the impeller ranging from 25° to 48° and 36° to 90°, respectively, for the turbine from 32° to 65° and 22° to 35°, respectively, and for the stator from 74° to 85° and 29° to 39°, respectively.

2. An hydraulic torque converter of the single stage type comprising a rotatable, bladed impeller, a rotatable, bladed turbine and a bladed stator arranged to form a toroidal liquid circuit, the impeller being located in the outward flow part of the circuit and the turbine and stator being located in inward flow part of the circuit with the outlets of the turbine blades being disposed closely adjacent the inlets of the stator blades, the outlets and inlets of the impeller and turbine and the outlets and inlets of the stator and impeller being respectively connected by U-shaped, outer and inner, unbladed passages, the radial dimension of each turbine blade being substantially greater respectively than the mean axial dimension of said turbine blade and than the radial dimension of each stator blade and the radial dimension of each stator blade being substantially less than the axial dimension thereof, the number of impeller, turbine and stator blades ranging respectively from 18 to 24, 24 to 30, and 40 to 48, and the inlet and outlet angles of each blade at the mean stream flow line of the circuit are measured respectively between the tangents to the mean camber line of the blade at its inlet and outlet tips and the tangents to circles determined by the radii of the inlet and outlet tips of the blade, the impeller and turbine blades and the stator blades being inclined counter to and in the rotation direction of the impeller, respectively, the inlet and outlet angles for the impeller ranging from 25° to 48° and 36° to 90°, respectively, for the turbine from 32° to 65° and 22° to 35°, respectively, and for the stator from 74° to 85° and 29° to 39°, respectively.

References Cited in the file of this patent

UNITED STATES PATENTS

| | | |
|---|---|---|
| 1,583,735 | Nydqvist | May 4, 1926 |
| 2,168,862 | Sensaud de Lavaud | Aug. 8, 1939 |
| 2,200,596 | Dodge | May 14, 1940 |
| 2,235,418 | Buchhart | Mar. 18, 1941 |
| 2,301,645 | Sinclair | Nov. 10, 1942 |
| 2,334,573 | Miller | Nov. 16, 1943 |
| 2,357,338 | Lysholm | Sept. 5, 1944 |
| 2,410,185 | Schneider et al. | Oct. 29, 1946 |
| 2,462,652 | Lysholm | Feb. 22, 1949 |
| 2,580,072 | Burnett | Dec. 25, 1951 |
| 2,634,584 | Burnett | Apr. 14, 1953 |
| 2,690,053 | Ahlen | Sept. 28, 1954 |
| 2,694,950 | Guentsche et al. | Nov. 23, 1954 |
| 2,697,330 | Odman | Dec. 21, 1954 |
| 2,707,539 | Marble | May 3, 1955 |
| 2,766,589 | O'Leary | Oct. 16, 1956 |